United States Patent

[11] 3,571,626

[72] Inventor Robert H. Reif
Groton, Mass.

[21] Appl. No. 787,756
[22] Filed Dec. 30, 1968
[45] Patented Mar. 23, 1971
[73] Assignee Sylvania Electric Products Inc.

[54] INTEGRATOR-SCHMITT TRIGGER CIRCUIT
9 Claims, 4 Drawing Figs.

[52] U.S. Cl. ........................................................ 307/263, 307/246, 307/265, 307/267, 307/290, 307/293, 328/58
[51] Int. Cl. ........................................................ H03k 5/12, H03k 1/18
[50] Field of Search ............................................ 307/246, 263, 265, 267, 290, 293; 328/58

[56] References Cited

UNITED STATES PATENTS

| | | | |
|---|---|---|---|
| 3,007,060 | 10/1961 | Guenther | 328/58X |
| 3,018,386 | 1/1962 | Chase | 307/290X |
| 3,073,971 | 1/1963 | Daigle, Jr. | 307/263 |
| 3,104,331 | 9/1963 | Zinke | 307/263X |
| 3,346,743 | 10/1967 | Strenglein | 307/267 |
| 3,473,050 | 10/1969 | Groom | 307/267 |

*Primary Examiner*—Stanley D. Miller, Jr.
*Attorneys*—Norman J. O'Malley, Elmer J. Nealon and Peter Xiarhos

ABSTRACT: A transistorized integrator-Schmitt trigger circuit for delaying the leading edge of an input pulse for a first predetermined time duration and for delaying the trailing edge of the input pulse for a second predetermined time duration. An input transistor is rendered conducting on the leading edge of an input pulse whereby current flows through the transistor to charge a capacitor included in an integrator circuit connected to the input transistor. The charging rate of the capacitor is adjusted such that the upper threshold level of a conventional Schmitt trigger circuit connected to the capacitor is achieved at a first predetermined time duration after the occurrence of the leading edge of the input pulse. As a result, a transition in the output level of the Schmitt trigger circuit occurs at the first predetermined time duration after the leading edge of the input pulse.

On the trailing edge of the input pulse, the input transistor is rendered nonconducting and the capacitor discharges. The discharge rate of the capacitor is adjusted such that the lower threshold level of the Schmitt trigger circuit is achieved at a second predetermined time duration after the occurrence of the trailing edge of the input pulse. As a result, the output of the Schmitt trigger circuit returns to its original level at the second predetermined time duration after the trailing edge of the input pulse. A charge reduction circuit is also provided for reducing the charge in the capacitor to zero after the output of the Schmitt trigger circuit has returned to its original level thereby increasing the duty cycle of the integrator-Schmitt trigger circuit.

INVENTOR.
ROBERT H. REIF

BY Peter Xiarhos
AGENT

INVENTOR.
ROBERT H. REIF

BY Peter Xiarhos

AGENT.

INTEGRATOR-SCHMITT TRIGGER CIRCUIT

BACKGROUND OF THE INVENTION

The present invention relates to a pulse forming circuit and, more particularly, to an integrator-Schmitt trigger circuit for delaying the leading edge of an input signal for a first predetermined time duration and for delaying the trailing edge of the input signal for a second predetermined time duration.

Schmitt trigger circuits for generating sharp, well-defined pulses for use in a variety of circuit applications are well known. Such Schmitt trigger circuits characteristically have a first, "turn-on" threshold level and, because of the presence of hysteresis in such circuits, a second, lower, "turn-off" threshold level. In operation, when an input signal having an amplitude equal to or exceeding the first threshold level (turn-on level) is applied to a Schmitt trigger circuit, a first transition occurs in the output level of the Schmitt trigger circuit thereby initiating a sharp, well-defined output signal; when the level of the input signal drops to or below the second threshold level (turnoff level), the output level of the Schmitt trigger circuit returns to its previous value thereby terminating the output signal.

It is often desirable to produce a sharp, well-defined output signal of the nature described, however, having the leading and trailing edges thereof delayed with respect to the corresponding leading and trailing edges of an input signal by predetermined equal or different amounts. It is, therefore, a principal object of the present invention to provide a pulse forming circuit and, more particularly, a pulse forming circuit including a Schmitt trigger circuit, for providing an output signal having its leading and trailing edges delayed with respect to the corresponding leading and trailing edges of an input signal by predetermined equal or different amounts. It is a further object of the present invention to provide a pulse forming circuit having an increased duty cycle.

BRIEF SUMMARY OF THE INVENTION

Briefly, in accordance with the present invention, a pulse forming circuit is provided for delaying the leading edge of an input pulse for a predetermined first time duration and for delaying the trailing edge of the input pulse for a predetermined second time duration. In accordance with the present invention, the pulse forming circuit generally comprises a charge storage means for storing electrical charges, a first circuit means coupled to the charge storage means for charging and discharging the charge storage means at predetermined rates in response to the occurrence of predetermined first and second input conditions at an input terminal thereof, and a second circuit means coupled to the charge storage means for producing predetermined first and second output conditions at an output terminal thereof in response to predetermined first and second charge levels in the charge storage means. Typically, the above-mentioned predetermined input conditions correspond to the leading and trailing edges of an input pulse.

In the more specific operation of the pulse forming circuit of the present invention, the input circuit means is operable in response to the occurrence of the first input condition (corresponding, for example, to the leading edge of an input pulse) at the input terminal to charge the charge storage means at a predetermined first rate, and operable in response to the occurrence of the second input condition (corresponding, for example, to the trailing edge of an input pulse) at the input terminal to discharge the charge storage means at a predetermined second rate.

The second circuit means of the invention has a first operating condition during which a first output condition is produced at the output terminal and a second operating condition during which a second output condition is produced at the output terminal. In response to a predetermined first charge level in the charge storage means, the second circuit means is operable to switch from the second operating condition to the first operating condition whereby the first output condition is produced by the second circuit means at the output terminal at a predetermined first time duration after the occurrence of the first input condition at the input terminal. In response to a predetermined second charge level in the charge storage means, the second circuit means is operable to switch from the first operating condition to the second operating condition whereby the second output condition is produced by the second circuit means at the output terminal at a predetermined second time duration after the occurrence of the second input condition at the input terminal.

A charge reduction circuit is also provided in the pulse forming circuit of the present invention for reducing the level of charge in the charge storage means thereby to increase the duty cycle of the pulse forming circuit. More specifically, the charge reduction circuit is coupled to the second circuit means and to the charge storage means and is operable in response to the second circuit means switching from the first operating condition to the second operating condition to reduce the charge remaining in the charge storage means to a third level less than the predetermined first and second charge level, the third charge level being, for example, a zero-charge level.

INTEGRATOR-SCHMITT TRIGGER CIRCUIT
1—GENERAL DESCRIPTION

Figure 1:
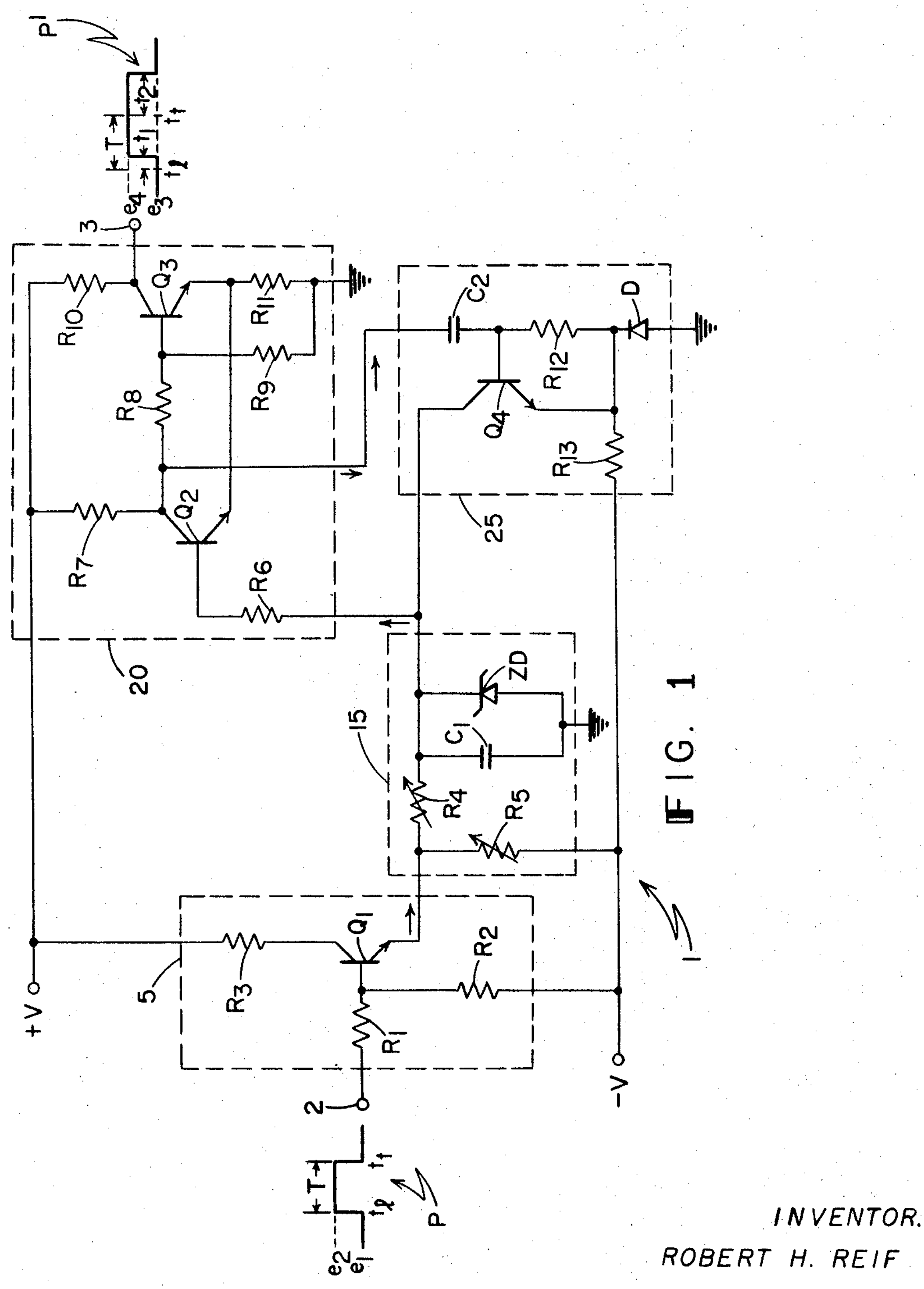
FIG. 1 illustrates in detailed schematic diagram form an integrator-Schmitt trigger circuit in accordance with the present invention.

Referring to FIG. 1 there is shown in detailed schematic diagram form an integrator-Schmitt trigger circuit 1 in accordance with the present invention. As indicated by the several dotted blocks in FIG. 1, the integrator-Schmitt trigger circuit 1 generally includes an input circuit 5 connected to an input terminal 2, an integrator circuit 15 coupled to the output of the input circuit 5, a conventional Schmitt trigger circuit 20 coupled to the output of the integrator circuit 15 and also to an output terminal 3, and a charge reduction circuit 25 coupled to the Schmitt trigger circuit 20 and to the integrator circuit 15.

An input pulse P, the leading edge of which is to be delayed by the integrator-Schmitt trigger circuit 1 for a first predetermined time duration and the trailing edge of which is to be delayed by the integrator-Schmitt trigger circuit 1 for a second predetermined time duration, is applied to the input terminal 2 of the integrator-Schmitt trigger circuit 1. An output signal P', representing a leading-and-trailing-edge-delayed version of the input pulse P, is provided by the integrator-Schmitt trigger circuit 1 at the output terminal 3.

The input circuit 5 includes an NPN input transistor $Q_1$ having its base electrode coupled to the input terminal 2 through an input resistor $R_1$. The base electrode of the input transistor $Q_1$ is also coupled to a source of negative potential $-V$ through a biasing resistor $R_2$. The collector electrode of the input transistor $Q_1$ is connected to a source of positive potential $+V$ through a current limiting resistor $R_3$ and the emitter electrode is connected directly to the input of the integrator circuit 15. The purpose of the input resistor $R_1$ is to limit the base drive to the input transistor $Q_1$ while the input transistor $Q_1$ is conducting and the resistor $R_3$ serves to limit the collector circuit current through the input transistor $Q_1$ to the integrator circuit 15 while the input transistor $Q_1$ is conducting. The resistor $R_2$ serves to bias the input transistor $Q_1$ into a state of nonconduction during the quiescent operating condition of the integrator-Schmitt trigger circuit 1, that is, with no input signal present at the input terminal.

The integrator circuit 15 includes a first variable resistor $R_4$ connected at one end to the emitter electrode of the NPN input transistor $Q_1$ and at the opposite end to one end of a storage capacitor $C_1$, the opposite end of the storage capacitor $C_1$ being connected directly to ground potential. A second variable resistor $R_5$ is connected at one end to the juncture of the emitter electrode of the NPN input transistor $Q_1$ and the first variable resistor $R_4$ and at the opposite end to the source of negative potential $-V$. A Zener diode ZD is connected at its cathode terminal to the juncture of the first variable resistor $R_4$ and the storage capacitor $C_1$ and at its anode terminal to ground potential.

As will become fully apparent hereinafter, the specific value of the first variable resistor $R_4$ determines the charging rate of the storage capacitor $C_1$ and also establishes the amount of the delay of the leading edge of the input pulse P sought to be provided by the integrator-Schmitt trigger circuit 1. The value of the second variable resistor $R_5$ determines the discharge rate of the storage capacitor $C_1$ and also establishes the amount of the delay of the trailing edge of the input pulse P sought to be provided by the integrator-Schmitt trigger circuit 1. As will also become apparent hereinafter, the Zener diode ZD serves to clamp the voltage across the storage capacitor $C_1$ to 0 volts during the quiescent operating condition of the integrator-Schmitt trigger circuit 1 and to its Zener breakdown voltage during the operation of charging the storage capacitor $C_1$.

The Schmitt trigger circuit 20, of a conventional type, includes an input resistor $R_6$ connected at one end to the cathode terminal of the Zener diode ZD and at the opposite end to the base electrode of an NPN triggering transistor $Q_2$. The collector electrode of the input triggering transistor $Q_2$ is coupled through a load resistor $R_7$ to the source of positive potential $+V$ and through a coupling resistor $R_8$ to the base electrode of an NPN output transistor $Q_3$. The emitter electrode of the input triggering transistor $Q_2$ is connected directly to the emitter electrode of the output transistor $Q_3$, the juncture of the two emitter electrodes of the transistors $Q_2$ and $Q_3$ being coupled through a common emitter resistor $R_{11}$ to ground potential. A resistor $R_9$ is provided between the base electrode of the output transistor $Q_3$ and ground potential. The collector electrode of the output transistor $Q_3$ is directly connected to the output terminal 3, and to the source of positive potential $+V$ through a load resistor $R_{10}$. The values of the upper and lower threshold levels of the Schmitt trigger circuit 20 are established by the selection of appropriate values for the resistors $R_6$ through $R_{10}$ and $R_{11}$ and also for the source of positive potential $+V$.

The charge reduction circuit 25 includes a differentiator capacitor $C_2$ directly connected at one end to the collector electrode of the NPN triggering transistor $Q_2$ and at the opposite end to the base electrode of an NPN discharge transistor $Q_4$. The base electrode of the discharge transistor $Q_4$ is coupled to ground potential through a differentiator resistor $R_{12}$ and a diode D. The collector electrode of the discharge transistor $Q_4$ is directly connected to the cathode terminal of the Zener diode ZD and the emitter electrode is directly connected to the juncture of the differentiator resistor $R_{12}$ and the diode D. A current limiting resistor $R_{13}$ is provided in series with the negative source of potential $-V$ and the emitter electrode of the discharge transistor $Q_4$ for limiting the current flow through the diode D while the diode D is conducting. As will become apparent hereinafter, the charge reduction circuit 25 serves to reduce the charge in the storage capacitor $C_1$ to zero after the desired output pulse P' has been produced at the output terminal 3 of the integrator-Schmitt trigger circuit 1 in preparation for the next operation of the integrator-Schmitt trigger circuit 1.

QUIESCENT OPERATION OF THE INTEGRATOR-SCHMITT TRIGGER CIRCUIT

In the quiescent operating stage of the integrator-Schmitt trigger circuit 1 of FIG. 1, a voltage level $e_1$ is present at the input terminal 2. During this condition, the NPN input transistor $Q_1$ is biased into its nonconducting state by the negative source of potential $-V$ and the biasing resistor $R_2$. Since there is insufficient base drive to the input transistor $Q_1$ due to the voltage level $e_1$ so as to drive the input transistor $Q_1$ into its conducting state, the input transistor $Q_1$ acts as an open circuit and no current flows through the input transistor $Q_1$. Thus, no current flows from the input circuit 5 to the integrator circuit 15.

During the quiescent operating state, the source of negative potential $-V$ attempts to charge the storage capacitor $C_1$ through the series path including the variable resistor $R_5$ and the variable resistor $R_4$. However, since the Zener diode ZD is forward biased, no charge is developed in the storage capacitor $C_1$. Since no charge is developed in the storage capacitor $C_1$ during the quiescent operating condition, and since the base electrode of the input triggering transistor $Q_2$ is at a positive potential as will be explained, the input triggering transistor $Q_2$ remains in its nonconducting state. The voltage at the collector electrode of the input triggering transistor $Q_2$ at this time is therefore positive and equal to the value of the source of positive potential $+V$ minus the voltage drop across the load resistor $R_7$. The positive voltage at the collector electrode of the input triggering transistor $Q_2$ is coupled to the base electrode of the output transistor $Q_3$ through the coupling resistor $R_8$. The value of the voltage at the base electrode of the output transistor $Q_3$ is equal to the voltage drop across the resistor $R_9$. The positive voltage at the base electrode of the output transistor $Q_3$ produces a forward bias for the base-emitter junction of the output transistor $Q_3$ and causes the output transistor $Q_3$ to operate in the saturation region and to provide an output voltage level $e_3$ (approximately equal to the input level $e_1$ at the input terminal 2) at the output terminal 3. Current flow from the emitter electrode of the output transistor $Q_3$, through the common-emitter resistor $R_{11}$, maintains the emitter electrode of the input triggering transistor $Q_2$ at a positive potential. The reverse bias developed between the emitter and base electrodes of the input triggering transistor $Q_1$ therefor maintains the input triggering transistor $Q_2$ in the nonconducting state.

With the NPN input triggering transistor $Q_2$ in the nonconducting state during the quiescent operating condition, the NPN discharge transistor $Q_4$ in the charge reduction circuit 25 is biased to its nonconducting state by the differentiator capacitor $C_2$ and the differentiator resistor $R_{12}$. The operation of the integrator-Schmitt trigger circuit 1 to delay the leading edge of the input pulse P by a first predetermined time duration and the trailing edge of the input pulse P by a second predetermined time duration will now be described.

OPERATION OF THE INTEGRATOR-SCHMITT TRIGGER CIRCUIT

LEADING EDGE TRIGGERING OPERATION

Figures 2A, 2B, 2C:
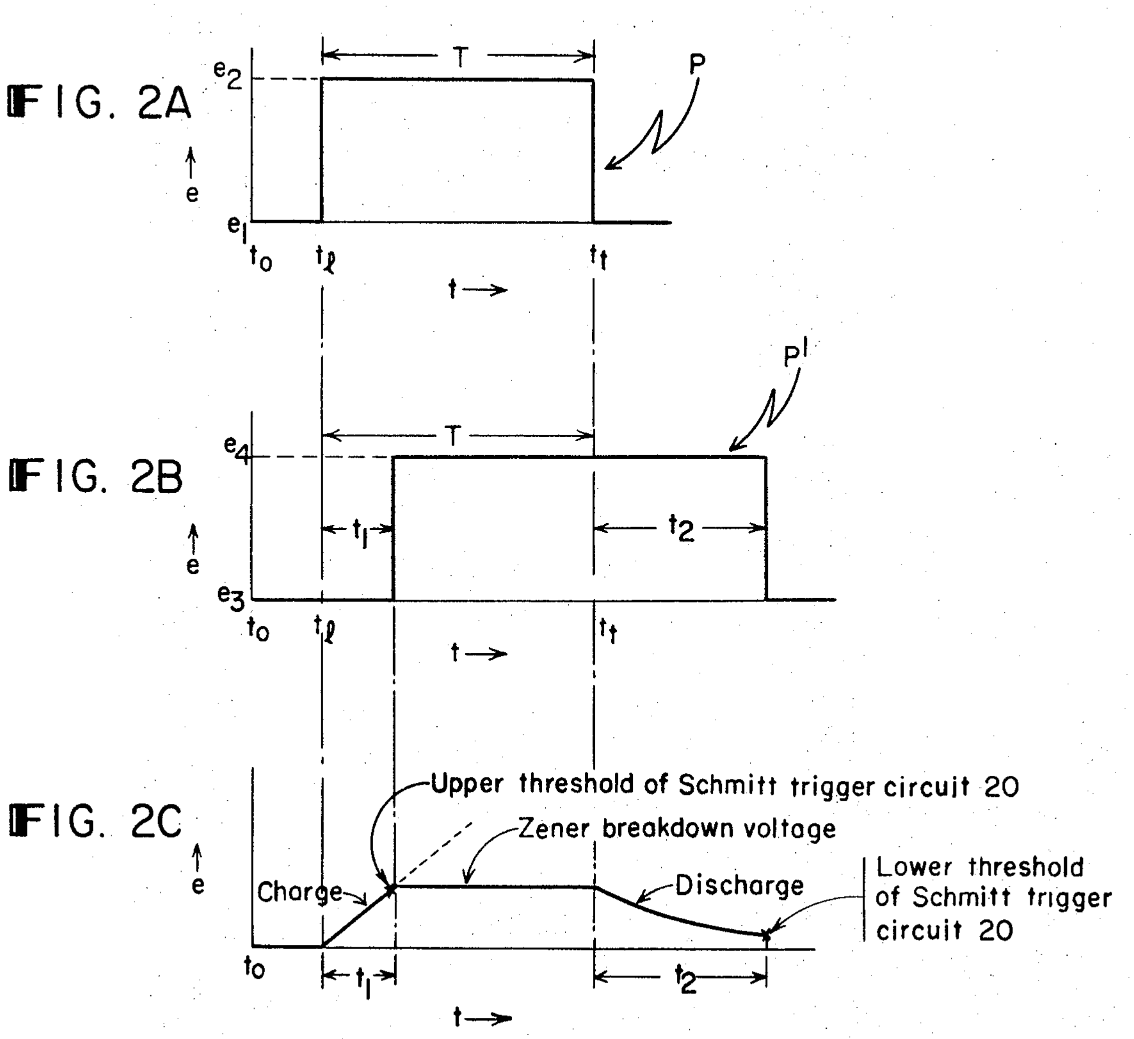
FIG. 2A illustrates the waveform of a typical input pulse the leading and trailing edges of which are to be delayed for predetermined time durations by the integrator-Schmitt trigger circuit of FIG. 1.
FIG. 2B illustrates the waveform of an output pulse provided by the integrator-Schmitt trigger circuit of FIG. 1 in response to receiving the input means FIG. 2A, the leading edge of the output pulse being delayed with respect to the leading condition of the input pulse of FIG. 2A by a first predetermined time duration and the trailing edge of the output being delayed with respect to the trailing edge of the input pulse by a second predetermined time duration.
FIG. 2C illustrates the waveform of a voltage signal developed across a storage capacitor included in the integrator-Schmitt trigger circuit of FIG. 1 during the operation of the integrator-Schmitt trigger circuit.

As shown in FIG. 1, and also in enlarged form in FIG. 2A, the input pulse P is positive and has a maximum amplitude of $e_2$ volts and a pulse width T; the leading edge of the input pulse P is indicated in FIGS. 1 and 2A as occurring at a time *tl* and the trailing edge is indicated as occurring at a time $t_t$.

On the positive-going, leading edge of the input pulse P (positive-going transition at $t_l$), the NPN input transistor $Q_1$ is rendered conducting and current flows through the collector and emitter circuits of the input transistor $Q_1$. The value of this current flow is determined from the particular values selected for the source of positive potential $+V$, the resistors $R_2$ and $R_3$, and the source of negative potential $-V$.

The current from the input transistor $Q_1$ flows through the variable resistor $R_4$ and into the storage capacitor $C_1$ and charges the storage capacitor $C_1$. The storage capacitor $C_1$ is charged, as indicated in FIG. 2C, to the upper threshold level of the Schmitt trigger circuit 20 at which time the input triggering transistor $Q_2$ is switched to its conducting state by the voltage across the storage capacitor $C_1$. Preferably, the upper threshold level of the Schmitt trigger circuit 20 is established, by appropriate selection of the values of the components thereof and the source of positive potential $+V$, to be just slightly less than the Zener breakdown voltage of the Zener diode ZD. Thus, just before the Zener breakdown voltage of the Zener diode ZD is reached, the reverse bias of NPN triggering transistor $Q_2$ is overcome and the triggering transistor $Q_2$ is rendered conducting by the voltage established across the storage capacitor $C_1$. As further charge is established in the storage capacitor $C_1$ by current flow from the input circuit 5, the Zener breakdown voltage of the Zener diode ZD is reached and the voltage across the storage capacitor $C_1$ is clamped to that value by the Zener diode ZD, again noting FIG. 2C.

The time required for the switching of the input triggering transistor $Q_2$, measured with respect to the leading edge of the input pulse P (at $t_l$), and indicated in FIG. 2C as being approximately equal to $t_1$, is established preferably by the variable resistor $R_4$, the effect of varying the value of the variable resistor $R_4$ being to vary the charge rate of the storage capacitor $C_1$. However, it is to be appreciated that this time may be alternatively established by varying the value of the storage capacitor $C_1$, and/or the value of the source of positive potential $+V$, and/or the value of the resistor $R_3$.

When the input triggering transistor $Q_2$ is rendered conducting by the voltage established across the storage capacitor $C_1$, the following action takes place in the Schmitt trigger circuit 20. The potential at the collector electrode of the input triggering transistor $Q_2$ decreases becomes less positive) and this change is coupled to the base electrode of the output transistor $Q_3$. The emitter current of the output transistor $Q_3$ accordingly decreases, thereby lowering the potential across the common-emitter resistor $R_{11}$. The emitter electrode of the input triggering transistor $Q_2$ therefore becomes less positive, increasing the forward bias thereof and increasing collector current. This regenerative action continues very rapidly in the well-known manner until the input triggering transistor $Q_2$ is operating in the saturation region and the output transistor $Q_3$ is operating in the nonconducting state. When the output transistor $Q_3$ is rendered nonconducting, the output level at the collector electrode of the output transistor $Q_3$ and, hence, at the output terminal 3, rises to a value of $e_4$ volts (approximately equal to $e_2$ volts). This transition, as indicated in FIG. 1, and also in FIG. 2A, occurs at a first predetermined time duration $t_1$ after the occurrence of the leading edge (at $t_l$) of the input pulse P.

The change in the voltage at the collector electrode of the input triggering transistor $Q_2$ (negative-going transition) as the input triggering transistor $Q_2$ is rendered conducting, as described above, is applied to the series combination of the differentiator capacitor $C_2$ and the differentiator resistor $R_{12}$. The negative-going transition of the voltage at the collector electrode of the input transistor $Q_2$ is differentiated by the differentiator capacitor $C_2$ and the differentiator resistor $R_{12}$ to produce a negative-going pulse at the base electrode of the NPN discharge transistor $Q_4$. Since the differentiated pulse is negative-going and since the NPN discharge transistor $Q_4$ is already nonconducting, the differentiated pulse produces no change in the operation of the discharge transistor $Q_4$ and the discharge transistor $Q_4$ therefore remains in the nonconducting state.

TRAILING EDGE TRIGGERING OPERATION

The above-described stable condition of the integrator-Schmitt trigger circuit 1 continues until the occurrence of the trailing edge of the input pulse P (at negative-going transition at $t_t$). On the trailing edge of the input pulse P, the NPN input transistor $Q_1$ is rendered nonconducting, that is, returned to its previous state of conduction, and current flow to the integrator circuit 15 ceases. With the input transistor $Q_1$ operating in its nonconducting state, the storage capacitor $C_1$ starts to discharge through a path comprising the variable resistors $R_4$ and $R_5$ and the source of negative potential $-V$ until the lower threshold level of the Schmitt trigger circuit 20 is reached. Preferably, the lower threshold level of the Schmitt trigger circuit 20 is set to be considerably below the Zener breakdown voltage of the Zener diode ZD and, therefore, considerably below the upper threshold level of the Schmitt trigger circuit 20.

The time required for the voltage across the storage capacitor $C_1$ to decrease to the lower threshold level of the Schmitt trigger circuit 20, measured with respect to the trailing edge of the input pulse P(at $t_t$), and indicated as $t_2$ in FIGS. 2B and 2C, is preferably established by the variable resistor $R_5$, the effect of varying the value of the variable resistor $R_5$ being to vary the discharging rate of the storage capacitor $C_1$. However, it is to be appreciated that the value of the time duration $t_2$ may be alternatively established by varying the value of the capacitor $C_1$, and/or the value of the source of negative potential $-V$ and/or the value of the resistor $R_4$. Although the time $t_2$ is shown in the figures to be greater than the time $t_1$, such a showing is exemplary only and, if desired, the time $t_2$ may be made to be equal to or less than the time $t_1$.

The lower threshold level of the Schmitt trigger circuit 20 is reached at the time $t_2$ as the potential at the base electrode of the input triggering transistor $Q_2$ is no longer able to sustain the conduction in the input triggering transistor $Q_2$. The voltage at the collector electrode of the input triggering transistor Q2 accordingly increases (positive-going transition), and the potential across the common-emitter resistor $R_{11}$ decreases. Simultaneously, the increasing positive voltage at the collector electrode of the input triggering transistor $Q_2$ is coupled to the base electrode of the output transistor $Q_3$ driving it positive; the decreasing voltage across the common-emitter $R_{11}$ therefore causes the potential at the emitter electrode of the output transistor $Q_3$ to go more negative. Both of the above actions forward-bias the emitter-base junction of the output transistor $Q_3$ and, because of the regeneration action, the output transistor $Q_3$ again operates in its saturation region and the input triggering transistor $Q_2$ is rendered nonconducting, the Schmitt trigger circuit 20 returning to its original operating condition. Thus, the output level at this time at the collector electrode of the output transistor $Q_3$ and, hence, at the output terminal 3, is again at $e_3$ volts, noting FIGS. 1 and 2B.

The positive-going transition of voltage at the collector electrode of the input triggering transistor $Q_2$ as the input triggering transistor $Q_2$ is switched back to its original nonconducting state applied to the series arrangement of the differentiator capacitor $C_2$ and the differentiator resistor $R_{12}$ and differentiated thereby. Thus, a positive-going pulse is applied to the base electrode of the NPN discharge transistor $Q_4$ causing the discharge transistor $Q_4$ to operate in its conducting state. When in its conducting state, the discharge transistor $Q_4$ presents a low-impedance discharge path for the storage capacitor $C_1$ and thereby permits the storage capacitor $C_1$ to discharge quickly. The diode D, coupled via the resistor $R_{13}$ to the source of negative potential $-V$, insures that the charge in the storage capacitor $C_1$ is reduced to zero, noting FIG. 2C, by placing the emitter electrode of the discharge transistor $Q_4$ at a negative value below ground potential. By reducing the charge in the storage capacitor $C_1$ to zero, new operation of the integrator-Schmitt trigger circuit 1 may quickly take place. As a result, the duty cycle of the integrator-Schmitt trigger circuit 1 is increased.

Some typical values for the parameters of the components of the integrator-Schmitt trigger circuit 1 which have been employed to provide a positive-going leading edge delay of 4 microseconds and a negative-going trailing edge delay of 7 microseconds are given below.

+V—+15 volts
−V —−8 volts
$e_1$ —0 volts
$e_2$ —+15 volts
T —6 microseconds
$Q_1$ —2N3565
$Q_2$ —2N3565
$Q_3$ —2N3565
$Q_4$ —2N3565
ZD —1N4733A; 5.1 volt breakdown voltage
D —1N914; (−0.6 volts)
$R_1$ —15 kilohms
$R_2$ —33 kilohms
$R_3$ —1 kilohm
$R_4$ —2 kilohms
$R_5$ —10 kilohms
$R_6$ —1 kilohm
$R_7$ —12 kilohms
$R_8$ —10 kilohms
$R_9$ —10 kilohms
$R_{10}$ —5.1 kilohms
$R_{11}$ —1 kilohm
$R_{12}$ —22 kilohms
$R_{13}$ —1.5 kilohms
$C_1$ —620 picofarads
$C_2$ —15 picofarads
Upper threshold level —4.9 volts
Lower threshold level —3.0 volts

I claim:

1. A pulse forming circuit comprising:
charge storage means for storing electrical charges;
first circuit means coupled to the charge storage means and having an input terminal, said first circuit means being operable in response to the occurrence of a first input condition at the input terminal to charge the charge storage means at a predetermined first rate and being operable in response to the occurrence of a second input condition at the input terminal to discharge the charge storage means at a predetermined second rate;
second circuit means coupled to the charge storage means and having an output terminal, said second circuit means having a first operating condition during which a first output condition is produced at the output terminal and a second operating condition during which a second output condition is produced at the output terminal;
said second circuit means being operable to switch from the second operating condition to the first operating condition in response to a predetermined first charge level in the charge storage means whereby the first output condition is produced at the output terminal at a predetermined first time duration after the occurrence of the first input condition at the input terminal and being operable to switch from the first operating condition to the second operating condition in response to a predetermined second charge level in the charge storage means whereby the second output condition is produced at the output terminal at a predetermined second time duration after the occurrence of the second input condition at the input terminal; and
charge reduction circuit means coupled to the second circuit means and to the charge storage means and comprising:
discharge circuit means coupled to the charge storage means and having a first operating condition and a second operating condition, said discharge means having a low impedance when in the first operating condition and a high impedance when in the second operating condition; and
differentiator circuit means coupled to the second circuit means and to the discharge circuit means and responsive to the second circuit means switching from the first operating condition to the second operating condition to produce an output condition for causing the discharge means to operate in its first operating condition whereby to provide a low-impedance discharge path for the charge in the charge storage means for reducing the charge remaining in the charge storage means to a third level less than the predetermined first and second charge levels.

2. A pulse forming circuit in accordance with claim 1 wherein the predetermined first charge level in the charge storage means is different from the predetermined second charge level in the charge storage means.

3. A pulse forming circuit in accordance with claim 1 wherein the third level of charge in the charge storage means is a zero-charge level.

4. A pulse forming circuit in accordance with claim 3 wherein:
the first circuit means is operative to charge the charge storage means at a rate greater than the rate at which the first circuit means discharges the charge storage means; and
the predetermined first charge level in the charge storage means is greater than the predetermined second charge level in the charge storage means.

5. A pulse forming circuit in accordance with claim 1 wherein the first circuit means includes:
an input circuit means having a conducting condition and a nonconducting condition and having an output connection therefrom;
said input circuit means being operable in the conducting condition in response to the first input condition at the input terminal and being operable in the nonconducting condition in response to the second input condition at the input terminal;
first impedance means connected in a series path between the output connection of the input circuit means and the charge storage means for passing current from the output connection to the charge storage means to charge the charge storage means when the input circuit means is in the conducting condition; and
second impedance means connected in a series path with the first impedance means and the charge storage means for providing a discharge path for the charge in the charge storage means when the input circuit means is in the nonconducting condition.

6. A pulse forming circuit in accordance with claim 5 wherein the first and second impedance means are resistances.

7. A pulse forming circuit in accordance with claim 5 further comprising: a breakdown device connected across the charge storage means and having a predetermined breakdown potential at which the breakdown device breaks down whereby said breakdown device breaks down when the potential developed across the charge storage means is equal to the predetermined breakdown potential thereby preventing further increase in the potential across the charge storage means.

8. A pulse forming circuit in accordance with claim 5 wherein:
the second circuit means includes a Schmitt trigger circuit, said Schmitt trigger circuit comprising:
first means having a first operating condition and a second operating condition;
second means having a first operating condition and a second operating condition, said second means being connected to the output terminal;
said second circuit means being in the first operating condition when the first means is in the first operating condition and the second means is in the second operating condition, and said second circuit means being in the second operating condition when the first means is in the second operating condition and the second means is in the first operating condition;

biasing means for biasing the second means to the first operating condition when the first means is in the second operating condition and for biasing the second means to the second operating condition when the first means is in the first operating condition; and means responsive to the predetermined first charge level in the charge storage means when the first means is in the second operating condition and the second means is in the first operating condition to trigger the first means to the first operating condition whereby the second means is triggered to the second operating condition and the first output condition is produced at the output terminal, and responsive to the predetermined second charge level in the charge storage means when the first means is in the first operating condition and the second means is in the second operating condition to trigger the first means to the second operating condition whereby the second means is triggered to the first operating condition and the second output condition is produced at the output terminal.

9. An integrator-Schmitt trigger circuit for delaying the leading edge of an input pulse for a predetermined first time duration and for delaying the trailing edge of the input pulse for a predetermined second time duration, comprising:

a storage capacitance for storing electrical charges;

an input terminal for receiving an input pulse;

a first source of potential;

a second source of potential;

an input transistor having a conducting condition and a nonconducting condition, said input transistor having a first electrode coupled to the input terminal and to the second source of potential, a second electrode coupled to the first source of potential, and a third electrode, said input transistor operating in the conducting condition in response to the occurrence of the leading edge of the input pulse at the input terminal and operating in the nonconducting condition in response to the occurrence of the trailing edge of the input pulse at the input terminal;

a first resistance connected at a first end to the third electrode of the input transistor and at the opposite end to a first end of the storage capacitance, the opposite end of the storage capacitance being connected to a third source of potential;

said first resistance passing current from the third electrode of the input transistor when the input transistor is in the conducting condition to the storage capacitance to charge the storage capacitance at a predetermined first rate;

a second resistance connected at a first end to the juncture of the first resistance and the third electrode of the input transistor and at the opposite end to the second source of potential;

said first and second resistances providing a discharge path to the second source of potential for charge in the storage capacitance when the input transistor is in the nonconducting condition, the discharge of the storage capacitance occurring at a predetermined second rate;

a Zener breakdown diode connected in parallel with the storage capacitance and having a predetermined Zener breakdown voltage, said Zener breakdown diode operating in response to the voltage across the storage capacitance reaching the Zener breakdown voltage during the charging of the storage capacitance whereby to clamp the voltage across the storage capacitance to the breakdown voltage;

a Schmitt trigger circuit comprising:

an input triggering transistor having a first electrode coupled to the first end of the storage capacitance, a second electrode coupled to the first source of potential, a third electrode;

a coupling resistance connected at a first end to the second electrode of the input triggering transistor an output transistor having a first electrode coupled to the opposite end of the coupling resistance, a second electrode coupled to the first source of potential, and a third electrode directly connected to the third electrode of the input triggering transistor;

a common resistance connected at a first end to the juncture of the third electrode of the input triggering transistor and the third electrode of the output transistor and at the opposite end to the third source of potential;

a resistance connected at one end to the first electrode of the output transistor and at the opposite end to the third source of potential;

the value of the first source of potential and the values of the resistances in the Schmitt trigger circuit being selected such that the output transistor is biased to the conducting condition when the input triggering transistor is in the nonconducting condition and the output transistor is biased to the nonconducting condition when the input triggering transistor is in the conducting condition;

an output terminal connected to the second electrode of the output transistor;

said input triggering transistor triggering to the conducting condition in response to a predetermined first voltage across the storage capacitance during the charging of the storage capacitance and applied to the first electrode of the input triggering transistor whereby the output transistor becomes biased to the nonconducting condition and initiates an output pulse at the output terminal, the leading edge of the output pulse occurring at a first predetermined time duration after the occurrence at the input terminal of the leading edge of the input pulse;

said predetermined first voltage being slightly less than the Zener breakdown voltage of the Zener breakdown diode;

said input triggering transistor switching to the nonconducting condition in response to a predetermined second voltage across the storage capacitance during the discharging of the storage capacitance and applied to the first electrode of the input triggering transistor whereby the output transistor becomes biased to the conducting condition and terminates the output pulse, the trailing edge of the output pulse being produced at a second predetermined time duration after the occurrence at the input terminal of the trailing edge of the input pulse;

a charge reduction circuit comprising:

A differentiator capacitance connected at a first end to the second electrode of the input triggering transistor;

a differentiator resistance connected at a first end to the opposite end of the differentiator capacitor;

a diode having a first electrode connected to the opposite end of the differentiator resistance and to the second source of potential and a second electrode connected to the third source of potential;

a discharge transistor having a conducting condition and a nonconducting condition, said discharge transistor having a first electrode connected to the juncture of the differentiator capacitance and the differentiator resistance, a second electrode connected to the first end of the storage capacitance, and a third electrode coupled to the second source of potential, said discharge transistor having a low impedance when in the conducting condition and a high impedance when in the nonconducting condition;

said discharge transistor being normally biased to the nonconducting condition; and said differentiator capacitance and differentiator resistance causing the discharge transistor to operate momentarily in its conducting condition when the input triggering transistor changes from the conducting condition to the nonconducting condition whereby a low-impedance discharge path is provided for the charge then present in the storage capacitance.